United States Patent [19]

Axinti et al.

[11] Patent Number: 4,688,468

[45] Date of Patent: Aug. 25, 1987

[54] METHOD OF AND APPARATUS FOR CONTROLLING PULSE HYDRAULIC GENERATORS

[75] Inventors: Gavril Axinti; Stefanica Arama; Ionel Draghici, all of Braila; Polidor Bratu, Bucharest; Corneliu Stanciu, Bucharest; Aurelian Ghinea, Bucharest; Florin Badulescu, Bucharest; Cristian Diaconu, Bucharest, all of Romania

[73] Assignee: Intreprinderea de Utilaj Greu "Progresul", Braila, Romania

[21] Appl. No.: 818,983

[22] PCT Filed: Jun. 8, 1983

[86] PCT No.: PCT/RO82/00003

§ 371 Date: Feb. 3, 1984

§ 102(e) Date: Feb. 3, 1984

[87] PCT Pub. No.: WO83/04427

PCT Pub. Date: Dec. 22, 1983

Related U.S. Application Data

[63] Continuation of Ser. No. 584,259, Feb. 3, 1984, abandoned.

[51] Int. Cl.[4] .................... F01L 25/02; F15B 11/10; F16D 31/02; B25D 9/00

[52] U.S. Cl. .................... 91/317; 91/318; 91/323; 91/433; 91/471; 60/418; 173/119

[58] Field of Search .................... 91/265, 317, 318, 323, 91/441, 461, 304, 420, 433, 440, 471; 60/418, 327; 173/119, 134

[56] References Cited

U.S. PATENT DOCUMENTS

| | | | |
|---|---|---|---|
| 1,626,087 | 4/1927 | Hultquist | 173/134 X |
| 2,550,723 | 5/1951 | Ross | 91/318 |
| 2,699,120 | 1/1955 | Schweisthal | 91/323 |
| 2,842,938 | 7/1958 | Burton et al. | 60/327 |
| 3,035,548 | 5/1962 | Wittlich | 173/134 X |
| 3,298,447 | 1/1967 | Gendron | 91/318 |
| 3,608,650 | 9/1971 | Matsusaka | 173/134 X |
| 3,910,045 | 10/1975 | Herrmann | 91/441 |
| 3,969,987 | 7/1976 | Wise | 91/317 |
| 4,002,103 | 1/1977 | Martin | 91/323 X |
| 4,064,694 | 12/1977 | Baudoin | 60/418 |
| 4,142,445 | 3/1979 | Loubauer | 91/523 |
| 4,152,970 | 5/1979 | Hall et al. | 91/318 |
| 4,193,264 | 3/1980 | Takahashi et al. | 60/418 |
| 4,275,793 | 6/1981 | Schivley et al. | 91/318 |
| 4,308,924 | 1/1982 | Boguth | 173/134 X |
| 4,314,612 | 2/1982 | Thomas et al. | 173/119 |
| 4,380,901 | 4/1983 | Rautimo et al. | 60/418 |
| 4,425,835 | 1/1984 | Krasnoff | 91/317 |
| 4,530,209 | 7/1985 | Steffes | 60/563 |

FOREIGN PATENT DOCUMENTS

| | | | |
|---|---|---|---|
| 1299922 | 7/1969 | Fed. Rep. of Germany . | |
| 1298753 | 7/1969 | Fed. Rep. of Germany . | |
| 2198065 | 3/1974 | France . | |
| 1143648 | 2/1969 | United Kingdom | 91/461 |
| 1178102 | 1/1970 | United Kingdom . | |

*Primary Examiner*—Abraham Hershkovitz
*Assistant Examiner*—George Kapsalas
*Attorney, Agent, or Firm*—Karl F. Ross; Herbert Dubno

[57] ABSTRACT

A piston for a striker is displaceable in a cylinder and forms compartments on opposite sides which can selectively be connected by hydraulically controlled valve elements to a pump and to an accumulator. A hydraulic controller for the valve elements initially connects a compartment on one side of the piston to contribute the pressure from a respective compartment to the accumulator during a lifting operation, cuts off the valve element affording this pressure accumulation to brake the piston, and other such valve elements enable the accumulator to be charged with the piston in its raised position so that, upon triggering by the controller of the valve elements, the pressure which drives the ram is equal to the total pressure delivered by the accumulator and the pump to the piston.

2 Claims, 1 Drawing Figure

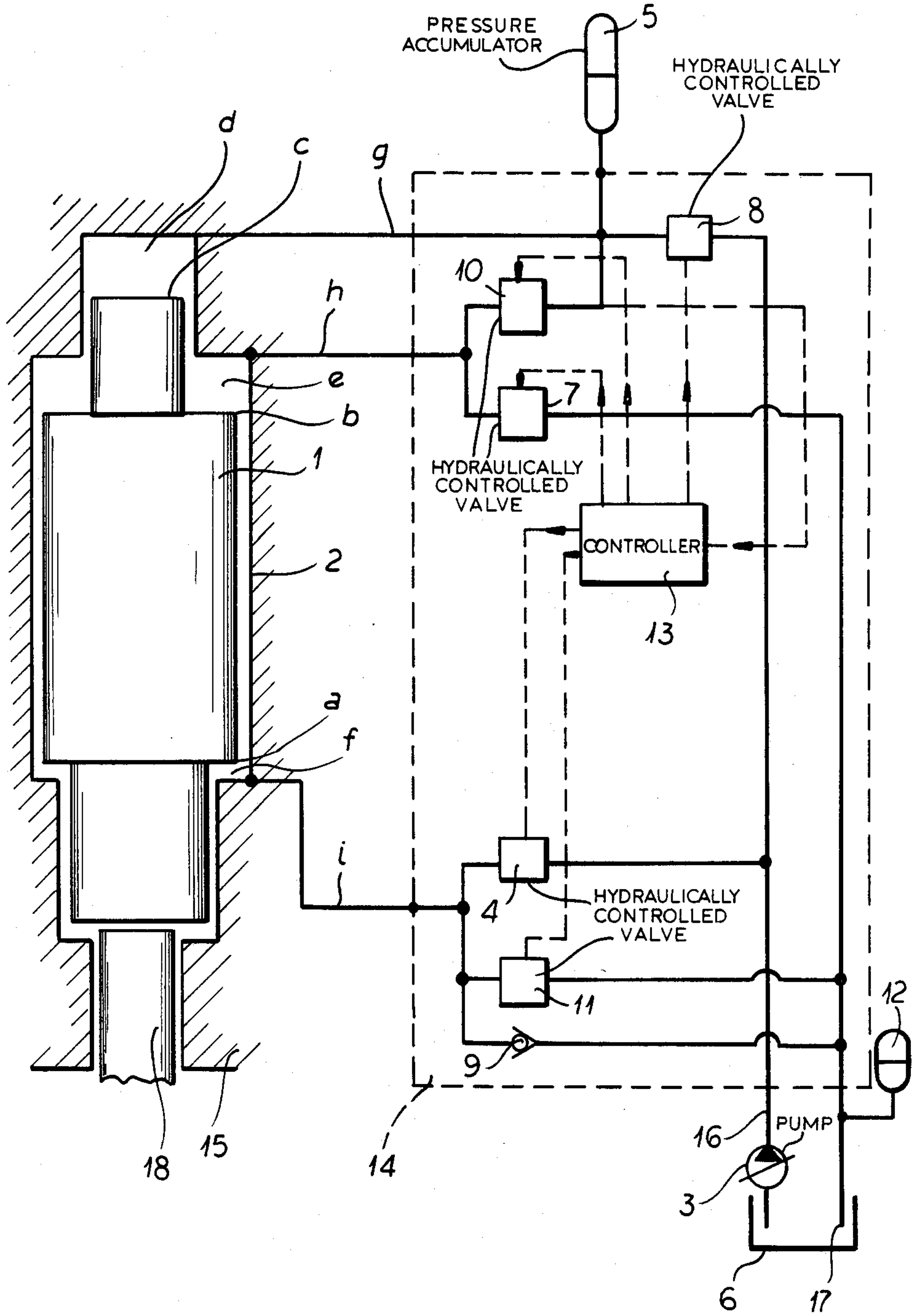
PRESSURE ACCUMULATOR
5
HYDRAULICALLY CONTROLLED VALVE
8
d
c
g
10
h
e
b
7
1
HYDRAULICALLY CONTROLLED VALVE
CONTROLLER
13
2
a
f
i
4
HYDRAULICALLY CONTROLLED VALVE
11
12
9
14
18
15
16
PUMP
3
6
17

METHOD OF AND APPARATUS FOR CONTROLLING PULSE HYDRAULIC GENERATORS

CROSS REFERENCE TO RELATED APPLICATIONS

This is a national phase application corresponding to International Application PCT/RO82/00003 filed June 8, 1982, upon which priority is claimed. This national application is a continuation of application Ser. No. 584,259 filed Feb. 3, 1984, now abandoned.

FIELD OF THE INVENTION

This invention relates to a method of and to an apparatus for controlling pulse hydraulic generators as used on hydraulic excavators or as autonomous installations for pile driving, crushing of oversize rock structures in mining, and in the knocking out of slag ladles.

BACKGROUND OF THE INVENTION

Methods and control installations are known for the actuation of striking elements using pulse hydraulic generators and wherein a distributing valve is incorporated in the pulse generator body and is controlled in turn by the striking element with or without a kinematic linkage with the distributing value.

These systems differ from one another as to the location of the striking element and distributing unit as well as in the reciprocal cooperation. But these installations have the disadvantage, inter alia, of difficult adaptation to various working conditions, limited range of standarized sizes, and long reaction times.

SUMMARY OF THE INVENTION

The method, according to the invention, eliminates these disadvantages because the control of the stiking element of the pulse generator is no longer conditioned by the striker position in its body but by the pressures achieved in the hydraulic circuits of the generator, pressures conditioned only by intermediate and limiting stages of the energy of the installation and of another energy accumulating element. The control installation, according to the invention, uses hydraulic binary logic elements, controlled by output signals from a hydraulic processor that analyzes the signals from accumulator and energy generator and, depending on their condition, distributes the working fluid to the striker, lifting it simultaneously with energy accumulation on the opposite side of the striker and lowering it with release of accumulated energy adding to the energy supplied by the energy generator of the circuit.

BRIEF DESCRIPTION OF THE DRAWING

The sole FIGURE of the drawing is a hydraulic diagram of the striking element of a pulse hydraulic generator according to the invention.

SPECIFIC DESCRIPTION

The method according to the invention, uses in achieving the effective work, a striking element 1 that can be lifted and lowered inside cylinder 2. Lifting and lowering forces of the striking element 1 are achieved by differentially applying pressure to working surface areas a, b and c of the striking element 1 in the cylinder 2. The phenomenon is cyclical and it consists of a lifting stage and of a lowering stage.

During the first part of the lifing stage of the striking element 1 in the compartment served by surface a the pressure fluid is introduced from a pump 3 through a logic element 4, e.g. an on-off valve.

The fluid from the compartment served by area c, on the up stroke is forced into an accumulator 5 and the fluid from the compartment served by area b is sent to a tank 6 through a logic element 7.

During the last part of the lifting stage, before the striking element 1 covers the entire stroke in cylinder 2, connection with pump 3 is interrupted by closing the logic element 4, pump 3 feeding the pressure fluid into accumulator 5 through logic element 8, leading to braking of the striking element 1. During this last stage a check valve 9, connected to tank 6, allows the filling of the compartment served by surface a.

After the striking element 1 has covered the entire stroke during the lifting stage, pump 3 goes on feeding the fluid into accumulator 5 until the maximum prescribed pressure for the accumulator is reached. The lowering stage of the striking element 1 starts at this moment. During this stage a chamber d served by area c is subjected to the action of pressure from accumulator 5 and pump 3 and by opening the logic element 10 and closing the logic element 7 and enclosure e served by area b will be under the action of pressure from accumulator 5 and pump 3.

To obtain maximum impact effect during lowering the chamber f served by surface a of the striking element 1 is connected through logic element 11 to tank 6 of the installation. Because during this stage the output discharged from chamber f served by area a increases the low pressure accumulator 12, connected to the return system of the installation, is used.

Opening and closing sequence of logic elements or values 4, 7, 8, 10 and 11 is analysed in hydraulic processor 13 depending on the prescribed pressure conditions in accumulator 5 and pump 3.

All the logic elements 4, 7, 8, 9 and 10 and processor 13 are incorporated in body 14 attached on another body 15 of the generator, not shown in the drawing, connection between these being accomplished through some grooves g, h and i formed in the two bodies 14 and 15. The accumulators 5 and 12 are connected with the body 14 and connection with pump 3 and tank 6 of the carrier equipment is done with flexible pipes 16 and 17.

A working tool 18 is mounted on the body 15 of the generator; impacts preduced by the striking element 1 are transmitted to the working environment.

The method and the installation, according to the invention, have the following advantages:

- easy adaptation of functional parameters to various working conditions owing to the considerable possibilities in adjusting the control installation;
- low cost of repair and maintenance;
- it utilizes efficiently all the energy available on the carrier equipemnt;
- it has a smaller cost price owing to simplification of production technology.

We claim:

1. A ram-type striker system comprising:

an upright piston displaceable in a cylinder and adapted to apply striking force to a tool upon a downward stroke of said piston, said piston having oppositely effective surfaces defining in said cylinder a lower compartment applying an upward force to said piston upon pressurization and a pair of upper compartments applying downward force to said piston upon pressurization;

a pump drawing hydraulic fluid from a reservoir;

a first hydraulically operable valve element connecting said pump to said lower compartment;

a second hydraulically actuatable valve element connecting one of said upper compartments with said reservoir;

means continuously connecting the other of said upper compartments with a first hydraulic pressure accumulator;

a third hydraulically actuatable valve element connecting said pump simultaneously with said pressure accumulator and with said other of said upper compartments;

a fourth hydraulically actuatable valve element connecting said lower compartment with said reservoir;

a fifth hydraulically actuatable valve element connecting said one of said upper compartments with said pressure accumulator;

a further accumulator connected in a line between said fourth valve and said reservoir;

a hydraulic controller responsive to the pressure in said first accumulator and connected to all of said valve elements for selectively actuating same in succession:

to pressurize said lower compartment while connecting said one of said upper compartments to said reservoir to raise said piston and thereby displace fluid from said other of said upper compartments into said first accumulator to pressurize same, to enable pressure buildup in said first accumulator from said pump with said piston in a raised position, and to connect said pump and said first accumulator simultaneously to both of said upper compartments and to connect said lower compartment to said second accumulator and said reservoir for downward displacement of said piston constituting said stroke; and a check valve connecting said reservoir to said lower compartment whereby continued upward displacement of said piston with said first and fourth valves closed enables fluid to be drawn into said lower compartment during braking of said piston in upward movement thereof by pressure at least in part supplied to said other upper compartment via said third valve element.

2. A method of operating a ram-type striker wherein a piston is displaceable in a cylinder and can be raised and lowered therein, said piston having respective surfaces on opposite sides thereof pressurizable in respective compartments at upper and lower ends of said piston, said method comprising the steps of:

(a) feeding pressure from a pump through a first valve element into a lower one of said compartments while connecting an upper one of said compartments to a reservoir returning fluid to said pump through a second valve element and continuously connecting another of said upper compartments to a pressure accumulator to raise said piston and force fluid from said other upper compartment into said accumulator to pressurize the same, said accumulator and said other upper compartment being cut off from said pump;

(b) thereafter terminating flow through said first and second valve elements and connecting said accumulator and said other upper compartment to said pump through a third valve element to initially brake further upward displacement of said piston while fluid is drawn through a check valve from said reservoir into said lower compartment until said piston reaches an upper position, and thereafter further pressurizing said accumulator in said upper position of said piston;

(c) connecting said lower compartment with said reservoir via a fourth valve element and connecting said accumulator with said one of said upper compartments via a fifth valve element while continuing to supply fluid from said pump to said accumulator and said other upper compartment whereby said piston is driven downwardly by accumulated pressure in said accumulator applied to both of said upper compartments in addition to pressure supplied by said pump to both of said upper compartments; and (d) hydraulically monitoring the pressure in said accumulator and triggering switchover of each of said first, second, third, fourth and fifth valve elements in response thereto.

* * * * *